N. B. Forrest.
Match Box Machine.
N° 91,429. Patented Jan. 15, 1869.
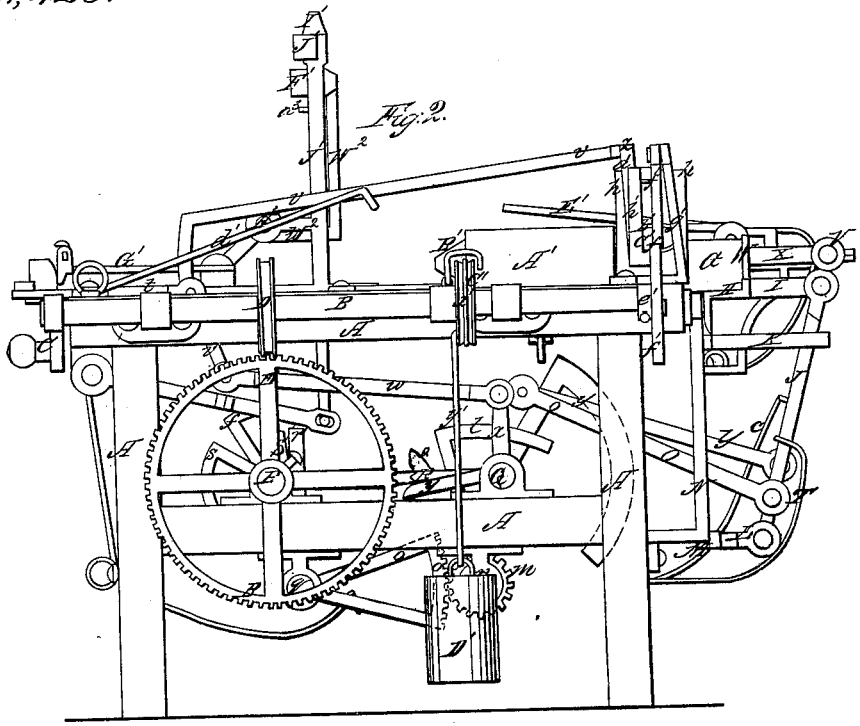
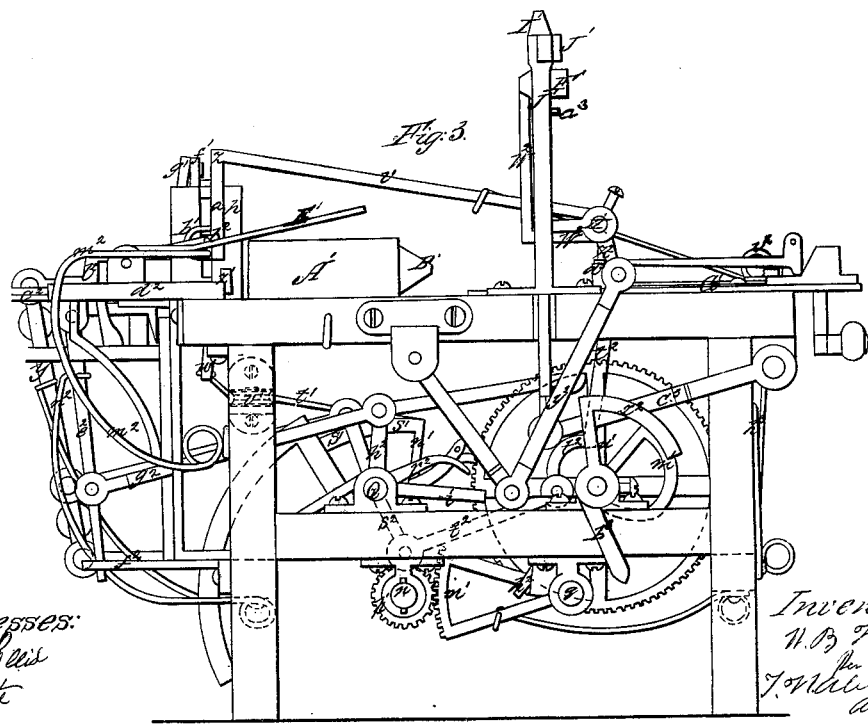
Witnesses:
Jno. A. Ellis
J. V. White
Inventor:
N. B. Forrest

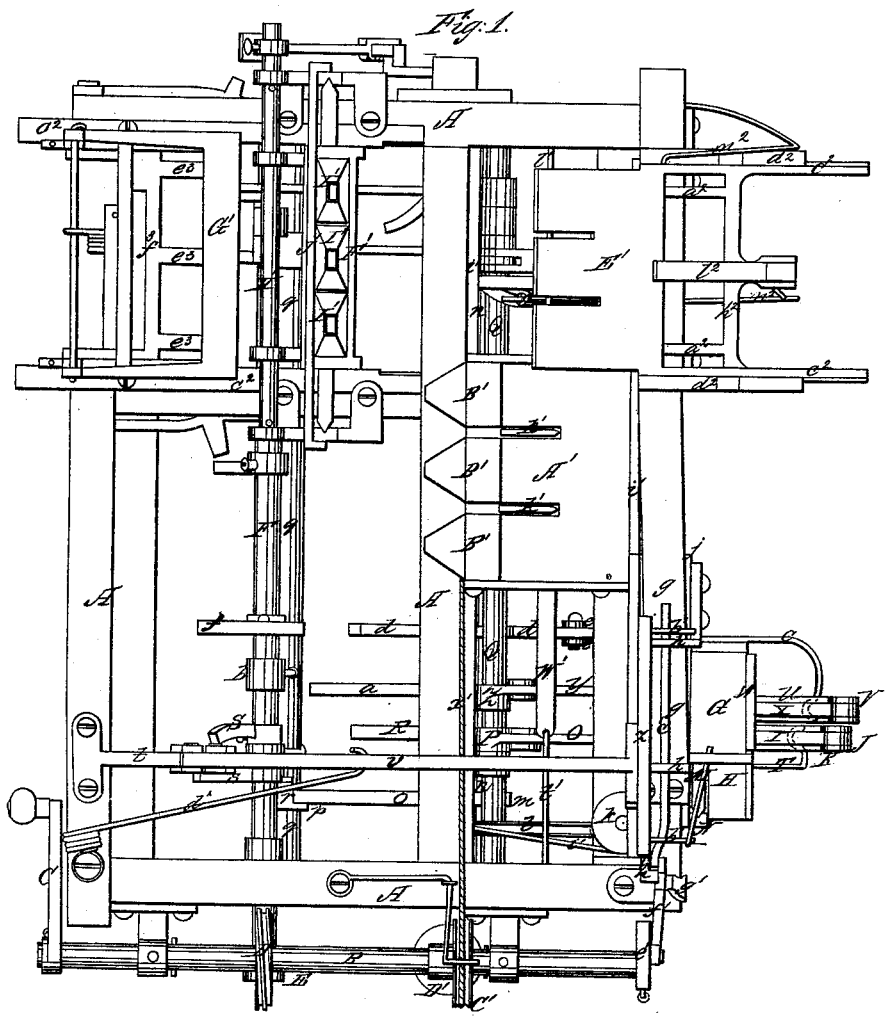

United States Patent Office.

NELSON B. FORREST, OF AUBURN, NEW YORK.

Letters Patent No. 91,429, dated June 15, 1869.

---

IMPROVEMENT IN MATCH-BOXING MACHINE.

---

The Schedule referred to in these Letters Patent and making part of the same.

---

*To all whom it may concern:*

Be it known that I, NELSON B. FORREST, of Auburn, in the county of Cayuga, and State of New York, have invented certain new and useful Improvements in Match-Boxing Machines; and I do hereby declare that the following is a full, clear, and exact description thereof, reference being had to the accompanying drawings, and to the letters of reference marked thereon, which form a part of this specification, and in which—

Figure 1 is a plan view, and
Figures 2 and 3, end elevations.

The nature of my invention consists in the construction and general arrangement of the hereinafter-described machine for boxing matches, and placing the covers on the boxes after they have been filled.

In order to enable others skilled in the art to which my invention appertains, to make and use the same, I will now proceed to describe its construction and operation.

But, to do so in the least possible space, I find it necessary to somewhat mix my description of the "construction" and the "operation" of the machine together. I will, therefore, describe the entire operation of the machine, mentioning the several parts of the machine, by letter, that perform the different functions for which they are intended.

A represents the frame of the machine, at one end of which, in suitable journal-boxes, is placed a shaft, B.

This shaft I have shown as being turned by a crank, C; but it is understood that it may be turned by any known power, for which purpose it may be provided with cog-wheels, pulleys, and belts, or other suitable gearing.

On the shaft B is placed a worm, D, which gears with a cog-wheel, E, secured to the end of the main shaft F, said main shaft being placed in appropriate journal-boxes in the ends of the frame A, and being provided with arms, cams, &c., which, during the revolution of the shaft F, put all the different parts of the machine in motion, as will be hereinafter fully set forth.

The matches, when manufactured, are always laid away for a short time to dry. They are, for that purpose, laid on a tray, G, of suitable size, consisting of a bottom with upright end pieces, but no sides.

The tray G is placed on the scraper H, placed at the front side of the machine, near the end where the shaft B is situated.

The scraper H is provided with an arm, I, extending outward, said arm being pivoted to a lever, J, which extends downwards through a slotted bar, K, to an arm, L.

The slotted bar K is attached to the upper end, and the arm L to the lower end of a sliding gate or frame, M, which moves up and down in grooves, between two vertical bars, N N, secured in some suitable manner to the front side of the frame A.

The lever J is connected, by a bar, O, to an arm on the collar P, said collar being movable on a shaft, Q, which is placed in the sides of the frame A, and running the entire length of the same.

The connecting-bar O is pivoted to the lever J, at a suitable point between the arm L and the slotted bar K, and also pivoted to the arm of the collar P, above mentioned.

Said collar P is also provided with an arm, R, extending toward the main shaft F, and is pressed downward at the proper time by an arm, S, extending from the main shaft, for the purpose of moving the scraper H, with the tray, inward.

As soon as the arm S ceases to operate on the arm R, a spring, T, secured to the frame A, and embracing the lever J, moves the scraper outward again.

The sliding gate M is provided with another slotted bar, U, similar to and placed along the side of the slotted bar K.

Through this slotted bar U, in like manner, passes a lever, V, the upper end of which carries the plunger W by means of the pivoted handle X, and the lower end of said lever is pivoted to an arm similar to and placed by the side of the arm L.

The lever V is, by means of the pivoted bar Y, connected with an arm on the collar Z, also placed on the stationary shaft Q.

The collar Z is also provided with an arm, $a$, extending toward the main shaft, which arm is operated upon by another arm, $b$, on the main shaft, which causes the plunger to move inward, and, being of the same size as the tray G, will pass through the same, carrying the matches before it.

A spring, $c$, encircling the lever V, forces the plunger back in its position, as soon as the pressure of the arm $b$ on the arm $a$ ceases.

The sliding gate M is raised up by means of the lever $d$, suitably pivoted between standards, $e\ e$, in the frame A, the front end of said lever extending through a hole in said gate, and the rear end, passing under the shaft Q, is operated upon by a cam or segment, $f$, on the main shaft F. The gate descends again of its own weight, as soon as the cam $f$ has passed off from the end of the lever $d$.

The matches being, as above mentioned, in the tray G, and this placed on the scraper H, when the machine is put in operation, the plunger W, moving inward, carries the matches off from the tray, leaving them on an elastic band, $g$, on top of the frame A, between two slotted standards, $h\ h$. The plunger W then, at once, is drawn back by the spring $c$.

One of the standards $h$ is stationary, but the other slides in a suitable groove on the frame, being drawn from the stationary standard by a rope or chain, $i$, attached to an arm extending downward through the frame from a slide, $j$, which is attached to or forms part of the movable standard $h$.

The slide $j$ runs under the elastic band $g$, or rather, the elastic band rests on the slide, and the arm to which the chain $i$ is attached passes through a slot in the frame.

The rope or chain $i$ passes around a pulley, $k$, in the frame A, and is attached to a bent arm, $l$, extending from a cogged collar, $m$, on a stationary shaft, $n$, placed underneath the shaft Q.

The cogged collar $m$ is operated upon by a cogged segment, $o$, attached to a collar, $p$, on a shaft, $q$, which is placed in the frame, underneath and slightly in front of the main shaft F.

This collar $p$ has an arm, $r$, extending upward, which is operated upon by a cam, $s$, on the main shaft, so that, by this means, as soon as the matches have been placed on the elastic band $g$, the movable standard $h$ will be moved a suitable distance, the band $g$ being, for this purpose, elastic, so as to stretch. This band is secured to the movable standard, passes through a slot in the stationary standard, and is secured to the frame A on the other side of the latter.

At the rear side of the frame A is secured a bar, $t$, extending a suitable distance forward.

At the front end of said arm a lever, $v$, is pivoted, said lever being bent, one end extending downward, and the other end upward and forward.

The lower end of the bent lever $v$ is, by a pivoted bar, $w$, connected with an arm, $x$, extending upward from a collar on the shaft Q.

This collar is provided with another arm, $y$, which is operated upon by an arm from the main shaft F, causing a downward movement of the front end of the bent lever $v$.

This end of the lever $v$ is provided with a cross-bar, $z$, which, at each end, has an arm, $a^1$, extending downward, the two arms $a^1 a^1$ being on the outside of the two standards $h\ h$.

At the lower ends of the arms $a^1 a^1$ are metal loops, $b^1$, in which rests the leveller $c^1$, said leveller consisting of a metal bar, which passes through the slotted standards $h\ h$, the slots in said standards being vertical, as shown in fig. 2.

The front end of the lever $v$ being, as above mentioned, moved downward, causes the leveller $c^1$ to descend on the pile of matches placed on the elastic band $g$, between the standards $h\ h$, and the leveller, being moved laterally from side to side, causes the matches to spread between said standards, and obtain a level surface.

As soon as the cam $s$ ceases to operate on the arm $r$, a spring, $d^1$, raises the front end of the lever $v$, with the leveller $c^1$, up again.

The lateral motion of the leveller or evener $c^1$, is produced by a crank, $e^1$, placed on the end of the shaft B, which crank works in the slotted end of a Z-shaped bar, $f^1$, the other end of which is pivoted to the upper end of a standard, $g^1$, secured on the corner of the frame A.

The pivoted end of the bar $f^1$ is provided with a bent bar, $h^1$, between which two bars the end of the leveller $c^1$ is inserted.

This end of the leveller is provided with a pin, which extends in a vertical slot, either in the bar $f^1$ itself, or in the bent bar $h^1$, so as not to present any obstacle in the way of raising or lowering the leveller.

It will be seen that by this means a steady and continuous motion is obtained for the leveller $c^1$, so that, when the same is lowered, it will, with the greatest ease, spread the matches level between the standards $h\ h$.

This being accomplished, and the leveller raised upwards out of the way by the spring $d^1$, the gate M rises, and the scraper H, which is of the same size as the distance between the standards $h\ h$, when separated, is moved inward, scraping or moving the matches from the elastic band $g$ into the carriage A', when the scraper at once moves backward, the gate descends, and the movable standard is drawn back to its original position by the elastic band.

The carriage A', which moves on slides $i'\ i'$, in the frame A, is of the same length as the distance between the two standards $h\ h$, when separated, and its bottom is slotted at regular intervals.

In these slots are placed dividing-boards $k'\ k'$, which rest on an inclined rod or plane, $l^1$, underneath the carriage A'.

This inclined rod or bar $l^1$ is secured at the ends of the frame A, and so arranged that when the carriage is in the position here supposed, that is, at that end of the machine where the matches are placed in the carriage, the said dividers $k'\ k'$ do not project above the upper surface of the bottom of the carriage.

But when the carriage is moved to the other end of the frame, by means that will hereinafter be set forth, the dividers rise gradually, until, when the carriage has arrived at the other end of the machine, they shall have entirely divided the matches into suitable piles, to be each one packed into a box.

On the rear side of the carriage A' is placed a series of spring-boxes, B' B', in number and size corresponding with the number of piles of matches to be made by the dividers $k'\ k'$.

The spring-boxes B' B' are stationary on the rear end of the carriage, and open at both ends, their rear ends contracting, however, as shown in the drawings, being in the shape of a hopper or four-sided funnel. The four sides of this end of the spring-box are not fastened together, but separate, so that they may yield to any pressure from the inside, which is the reason why I have given them the name of "spring-boxes."

On the funnel-shaped ends of the spring-boxes B' B', the boxes, in which the matches are to be packed, are placed.

The carriage A', having received the matches by means of the scraper H, as above described, is moved on the slides $i'\ i'$ to the other end of the frame A, during which movement the dividers $k'\ k'$, ascending the inclined plane $l^1$, rise above the surface of the bottom of the carriage, dividing the matches into piles, each pile being exactly opposite the entrance to one of the spring-boxes.

The movement of the carriage A', from its original position to the other end of the machine, is produced by a cam, placed on the main shaft F, acting on the segment $m^1$, which operates an arm, $n^1$, attached to the collar of a cogged pinion, $p^1$, this collar being placed on the shaft $n$.

To the segment $s^1\ s^1$, connected by cogged collar $p^1$, on the shaft $n$, a rope or chain, $t^1$, is attached.

This rope passes around a pulley, $v^1$, and its other end is attached to the bar $w^1$, extending from one end of the carriage, so that, as soon as the segment $m^1$ commences to operate on the arm $n^1$, the carriage A' will commence to move from its original position, and continue to so move until it arrives at the other end of the machine.

When the carriage arrives there, it takes but a moment to pack the matches in the boxes already placed on the ends of the spring-boxes B' B', and remove the same by means that will hereinafter be set forth.

At the same time the segment $m^1$ ceases to operate on the arm $n^1$, when the carriage will at once return to the place from whence it came, to receive a new load of matches.

This backward movement of the carriage is accomplished by the following means:

To the end of the carriage, nearest the shaft B, is attached a rope or chain, $x^1$, which, when the carriage is in its original position, is passed a suitable number of times around a pulley, C′, placed loose on the shaft B, the other end of said chain being secured or attached to this pulley.

From the pulley C′ is suspended a weight, D′, by means of another rope or chain, $y'$, which also is secured to the same loose pulley.

When, now, the carriage A′ is, by the means and in the manner above described, moved to the other end of the machine, the chain $x^1$ will of course turn the pulley C′, which will unwind the chain $x^1$, but, at the same time, wind up the chain $y^1$, and raise the weight D′.

As soon as, now, the force which produced this movement of the carriage ceases to operate, the weight D′ will turn the pulley C′ in the opposite direction, unwinding the chain $y^1$, rewinding the chain $x^1$, and consequently bring the carriage A′ back to its original position.

The pulley C′, being loose on the shaft B, it will be seen that the continuous motion of said shaft does in no way interfere with the motion of the pulley C′, which, of course, occurs once for every revolution of the main shaft F.

When the carriage A′ has thus arrived at the other end of the machine, as above set forth, it will be directly opposite to a set of plungers, $z^1$, each of which is placed on an arm, $a^2$, extending from a cross-bar, $b^2$, which cross-bar connects two side-bars $c^2 c^2$, thus forming a frame, which slides in grooves on two stationary bars $d^2 d^2$, which extend forward from the top of the frame A.

The sliding frame thus formed is operated by a bar, $e^2$, pivoted to the cross-bar $b^2$, and extending downward through a hole or slot in an arm, $f^2$, which extends forward from the lower portion of the frame A.

This bar $e^2$ is, by a pivoted bar, $g^2$, connected with an arm, $h^2$, projecting upward from a collar on the shaft Q.

Another arm, $i$, extends toward the rear from the same collar, and is operated upon by a cam on the main shaft F, thus causing the sliding frame, with the plungers $z^1$, to move inward.

From the cross-bar $b^2$, an inclined arm, $l^2$, projects inward, which arm, as the sliding frame moves inward, presses on a hinged cover, E′, forcing the same down on top of the matches in the carriage.

The hinged cover E′ is provided with a series of slots, as seen in fig. 1, corresponding in size and position with the dividers $k' k'$ in said carriage, so that when the said cover is, in the manner above set forth, lowered or placed on the matches the dividers project in said slots, the carriage, dividers, and cover, thus forming a series of boxes, in each of which is a suitable number of matches for packing away.

The plungers $z^1$, which are of the proper size to fit, each in one of said spaces, moving inward, carry the matches through the spring-boxes B′ B′ into the boxes placed on the same, and also carry the boxes of matches thus packed into a rack or series of open boxes, F′.

As soon as the plungers $z^1$ move backward, a spring, $m^2$, raises the hinged cover E′ up from the carriage, the plungers themselves being moved back by a spring, $n^2$, as soon as the action of the cam on the arm $i$ ceases.

The rack F′ is, by two bent arms $w^2 w^2$, secured to a shaft, H′, placed in suitable journal-boxes on top of the frame A, so that as soon as the rack F′ has received the boxes of matches from the carriage A′, it is raised up in the position shown in the drawings, which brings the open top of the boxes upwards.

This movement of the shaft H′ is produced by a cam, $x^2$, placed on the end of the main shaft P, which operates a pivoted arm, $y^2$, attached to a crank, $z^2$, on the end of said shaft.

As soon as the action of the cam $x^2$ ceases, the rack F′ descends again of its own weight; but in the mean time the covers have been placed on the boxes of matches, and new empty boxes placed on the spring-boxes B′ B′ of the carriage A′, in the following manner:

Above the rack F′, when raised to the position shown in the drawings, is placed a frame, J′, which is provided with a series of spring-boxes, I′ I′, similar in construction to those of the carriage A′.

On top of these spring-boxes I′ I′ are placed the covers to the match-boxes in the rack F².

A set of plungers, $a^3$, provided with handles, is placed on a cross-bar, which slides in the frame J′, above the bent arms $w^2 w^2$, which carry the rack F′.

When the rack is raised up in the manner above set forth, these arms raise the cross-bar, with the plungers $a^3$, as far as they move themselves, when two arms $b^3$ on the main shaft F, operating on pivoted levers $c^3$, connected with said cross-bar, raise it and the plungers $a^3$ high enough to force the boxes contained in the rack F through the spring-boxes I′ I′, which action causes the covers to be placed on the same.

During this time new boxes have been placed on the spring-boxes B′ B′ on the carriage A′, by means of a carriage, G′, and plungers $d^3$, the carriage G′ being divided at its front end in suitable spaces, each to contain one box, the plungers $d^3$ working in said spaces.

The carriage G′ slides in grooves on two bars $o^2 o^2$, placed on top of the frame A, at the rear side.

It is moved forward or inward by an arm, $p^2$, on the main shaft F, which arm strikes an arm, $r^2$, projecting from a collar on the shaft Q, this collar being provided with still another arm, $s^2$, and this arm by two pivoted bars $t^2 t^2$, connected with the carriage.

As soon as the action of the arms $p^2$ and $r^2$ ceases, the carriage G is moved backward again by a spring, $v^2$.

The movement of the carriage G′ inward brings its inner end close to the ends of the spring-boxes B′ B′, when the plungers $d^3$ are moved inward, forcing the empty boxes on to the said spring-boxes.

The plungers $d^3$ are provided with arms $e^3 e^3$ attached to a slide, $f^3$, which moves inside of the carriage G′, and is provided with an arm extending downward.

This arm or lever is pivoted to the slide $f^3$, and also a little lower down between ears on the under side of the carriage, the lever extending below this last pivot-point, so that when its lower end comes in contact with an obstacle, the plungers will readily be moved either inward or outward.

For this purpose, there is placed, underneath the carriage G′, a bent spring or rod, $h^3$, which is so arranged, that at the instant when the carriage G′ has been moved as far as it can go inward, (of course carrying the plungers with it,) the plungers continue their inward motion, forcing the empty match-boxes on to the spring-boxes B′; and when the carriage G′, by its spring $v^2$, is moved back outward, the plungers $d^3$ will be withdrawn from the spaces where the empty match-boxes were placed, allowing new ones to be placed therein, the top of the carriage G′ being, for that purpose, hinged, or otherwise made adjustable.

Having thus fully described my invention,

What I claim as new, and desire to secure by Letters Patent is—

1. The combination of the sliding gate M, scraper H, and plunger W, when constructed and arranged to operate substantially as and for the purposes herein set forth.

2. The arrangement of the bent arm $v$, cross-bar $z$, arms $q^1 a^1$, and evener $c^1$, all substantially as and for the purposes herein set forth.

3. The slotted carriage A′, provided with spring-boxes B' B' and dividers $k'$ $k'$, or their equivalents, in combination with the arm $n^1$ and the inclined $l^1$, substantially as described.

4. The combination of the plungers $z^1$ $z^1$, handles $a^3$ $a^3$, cross-bar $b^2$, sliding bars $c^2$ $c^2$, inclined bar $l^2$, and slotted hinged cover E', all constructed and arranged to operate substantially as and for the purposes herein set forth.

5. The hinged rack F'', or its equivalent, constructed so as to receive the boxes of matches, when packed, and carry them to the place where the covers are to be placed on the same, substantially as herein set forth.

6. The combination of the frame J', rack F'', and plungers $a^3$, with the spring-boxes I' I' on said frame, all constructed and arranged to operate substantially as and for the purposes herein set forth.

7. The sliding carriage G' and sliding plungers $d^3$ $d^3$, constructed and arranged to operate substantially as and for the purposes herein set forth.

8. The arrangement of the shaft B, pulley C', weight D', chains $x^1$ $y^1$, and carriage A', all constructed and operating substantially as and for the purposes herein set forth.

In testimony that I claim the foregoing as my own, I affix my signature, in presence of two witnesses.

NELSON B. FORREST.

Witnesses:
   JOSIAH FIERO,
   CALVIN N. SITTSER.